(12) United States Patent
Ideshio et al.

(10) Patent No.: US 12,241,444 B2
(45) Date of Patent: Mar. 4, 2025

(54) POWER GENERATION DEVICE

(71) Applicant: TOYOTA JIDOSHA KABUSHIKI KAISHA, Toyota (JP)

(72) Inventors: Yukihiko Ideshio, Nisshin (JP); Naoyuki Miyara, Nagoya (JP); Akira Hanamaki, Toyota (JP); Kazuhiko Yuasa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/200,290

(22) Filed: May 22, 2023

(65) Prior Publication Data
US 2024/0035434 A1  Feb. 1, 2024

(30) Foreign Application Priority Data
Aug. 1, 2022  (JP) .................... 2022-122813

(51) Int. Cl.
*F03B 11/00* (2006.01)
*F03B 17/06* (2006.01)
*H02K 7/116* (2006.01)
*H02K 7/18* (2006.01)

(52) U.S. Cl.
CPC .............. *F03B 11/00* (2013.01); *F03B 17/06* (2013.01); *H02K 7/116* (2013.01); *H02K 7/1823* (2013.01); *F05B 2220/706* (2013.01)

(58) Field of Classification Search
CPC .......... F03B 11/00; F03B 17/06; H02K 7/116; F05B 2220/706; H02P 2101/10
See application file for complete search history.

(56) References Cited

U.S. PATENT DOCUMENTS

| | | | | |
|---|---|---|---|---|
| 1,249,059 A | * | 12/1917 | Ford | B60K 17/306 180/262 |
| 1,506,653 A | * | 8/1924 | Meilike | B60K 17/34 180/238 |
| 2,427,130 A | * | 9/1947 | Ford | G01C 19/44 235/407 |

(Continued)

FOREIGN PATENT DOCUMENTS

| | | |
|---|---|---|
| JP | 2009-115027 A | 5/2009 |
| JP | 2013-064393 A | 4/2013 |
| WO | 2010/086958 A1 | 8/2010 |

*Primary Examiner* — Pedro J Cuevas
(74) *Attorney, Agent, or Firm* — Oliff PLC

(57) ABSTRACT

The power generation device disclosed in the present specification includes a first rotating body, a second rotating body, a differential device, and a generator. The first rotating body and the second rotating body convert energy of the fluid into rotational motion. The differential device is connected to the first rotating body via a first transmission path, and is connected to the second rotating body via a second transmission path, and combines and outputs the rotational motion of the first rotating body and the rotational motion of the second rotating body. The generator converts rotational motion output from the differential device into electrical energy. The first rotating body and the second rotating body are arranged along the first direction. The differential device is disposed offset from the first rotating body and the second rotating body in a second direction perpendicular to the first direction.

5 Claims, 2 Drawing Sheets

(56) References Cited

U.S. PATENT DOCUMENTS

| | | | | |
|---|---|---|---|---|
| 6,984,899 B1* | 1/2006 | Rice | | F03D 15/10 290/55 |
| 8,178,991 B2* | 5/2012 | Smith | | F03D 1/0608 290/55 |
| 8,232,664 B2* | 7/2012 | Stroup | | F03D 15/10 290/55 |
| 8,247,918 B2* | 8/2012 | Smith | | F03D 1/0658 290/55 |
| 8,253,268 B1* | 8/2012 | Smith | | F03D 7/0276 290/55 |
| 8,482,150 B2* | 7/2013 | Smith | | F03D 1/0608 290/55 |
| 8,702,560 B2* | 4/2014 | Ohno | | B60W 30/18127 477/5 |
| 8,710,694 B2* | 4/2014 | Smith | | F03D 15/00 290/55 |
| 9,617,979 B2* | 4/2017 | Smith | | F03D 1/025 |
| 10,041,468 B2* | 8/2018 | Lai | | F03B 13/10 |
| 10,294,915 B2* | 5/2019 | Lee | | F03B 13/26 |
| 2010/0045039 A1* | 2/2010 | Stroup | | H02P 9/04 290/55 |
| 2011/0223017 A1* | 9/2011 | Smith | | F03D 9/25 416/1 |
| 2012/0190497 A1* | 7/2012 | Smith | | F03D 15/10 476/57 |
| 2012/0217753 A1* | 8/2012 | Smith | | F03D 1/0608 290/55 |
| 2012/0220420 A1* | 8/2012 | Ohno | | E02F 9/2075 180/65.265 |
| 2012/0326450 A1* | 12/2012 | Smith | | F03D 15/00 290/1 C |
| 2013/0195623 A1* | 8/2013 | Chung | | F03B 17/063 415/121.3 |
| 2014/0035287 A1* | 2/2014 | Smith | | F03D 80/70 290/55 |
| 2015/0115614 A1* | 4/2015 | Smith | | F03D 9/25 290/55 |
| 2023/0228239 A1* | 7/2023 | Shibata | | F03B 11/00 415/122.1 |

* cited by examiner

POWER GENERATION DEVICE

CROSS-REFERENCE TO RELATED APPLICATION

This application claims priority to Japanese Patent Application No. 2022-122813 filed on Aug. 1, 2022, incorporated herein by reference in its entirety.

BACKGROUND

1. Technical Field

The technology disclosed in the present specification relates to a power generation device. The technology disclosed in the present specification particularly relates to a power generation device including a rotating body (for example, a water turbine or a wind turbine). The rotating body converts the energy of the fluid into rotational motion.

2. Description of Related Art

Japanese Unexamined Patent Application Publication No. 2009-115027 (JP 2009-115027 A) discloses a power generation device including a first rotating body (that is referred to as a first impeller in JP 2009-115027 A), a second rotating body (that is referred to as a second impeller in JP 2009-115027 A), and a differential device (that is referred to as a differential gear device in JP 2009-115027 A). The differential device is provided between the first rotating body and the second rotating body. The differential device combines the rotational motion of the first rotating body and the second rotating body. The differential device transmits the rotational motion to the input shaft of the generator.

SUMMARY

In the power generation device of JP 2009-115027 A, the differential device is coaxially disposed between the first rotating body and the second rotating body. With such a configuration, there is a high risk that the differential device is exposed to the fluid. Further, the durability of the differential device may be deteriorated. The present specification provides a technology capable of improving the durability of a differential device as compared with the related art.

A power generation device disclosed in the present specification includes: a first rotating body that converts energy of fluid into rotational motion; a second rotating body that converts energy of fluid into rotational motion; a differential device that is connected to the first rotating body via a first transmission path, that is connected to the second rotating body via a second transmission path, and that combines the rotational motion of the first rotating body and the rotational motion of the second rotating body and outputs the rotational motion; and a generator that converts the rotational motion output from the differential device into electric energy. The first rotating body and the second rotating body are arranged along a first direction. The differential device is disposed to be offset in a second direction perpendicular to the first direction, with respect to the first rotating body and the second rotating body.

In the vehicle described above, the differential device is disposed to be offset in a second direction perpendicular to the first direction, with respect to the first rotating body and the second rotating body arranged along the first direction in the fluid. Thus, the differential device is disposed outside the fluid. As a result, in the power generation device disclosed in the present specification, the differential device is less likely to be exposed to the fluid. Accordingly, in the power generation device, the durability of the differential device can be improved as compared with the related art.

Details and further improvements of the technology disclosed in the present specification are described in DETAILED DESCRIPTION OF EMBODIMENTS below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
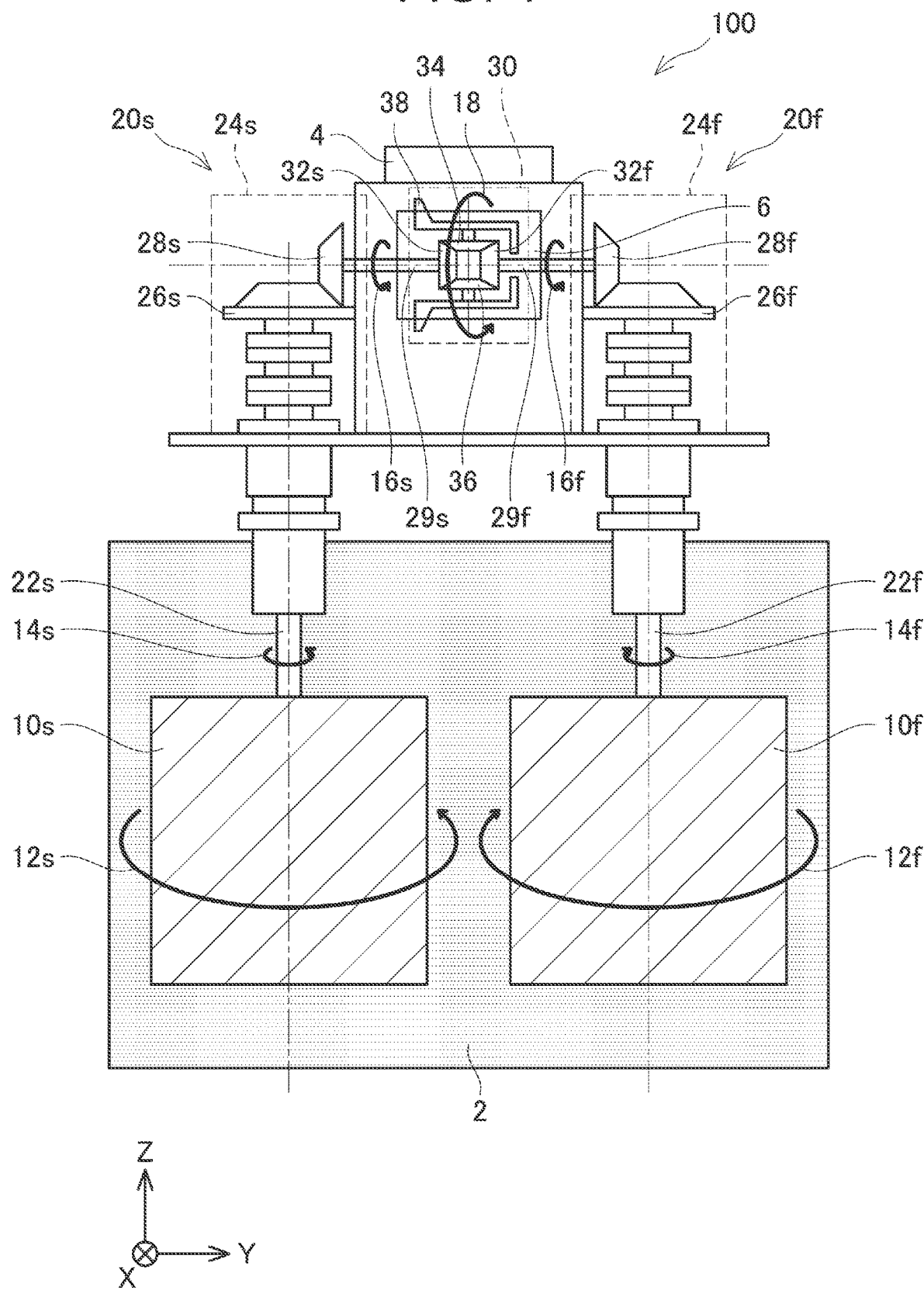
FIG. 1 shows a front view of a power generation device 100 of an embodiment.

In an embodiment of the present technology, the first direction may be a horizontal direction. The second direction may be a vertical direction. In this case, the differential device may be positioned vertically above the first rotating body and the second rotating body. However, in another embodiment, for example, the first direction may be a vertical direction and the second direction may be a horizontal direction.

In an embodiment of the present technology, the first transmission path may include a first vertical rotation axis, a first horizontal rotation axis, and a first transmission. The first longitudinal rotation axis extends upward from the first rotating body. A first horizontal axis of rotation extends horizontally from the first vertical axis of rotation to the differential device. The first transmission connects the first vertical rotation shaft and the first horizontal rotation shaft to each other. The second transmission path may include a second vertical rotation axis, a second horizontal rotation axis, and a second transmission. The second longitudinal rotation axis extends upward from the second rotating body. A second horizontal axis of rotation extends horizontally from the second vertical axis of rotation to the differential device. The second transmission connects the second vertical rotation shaft and the second horizontal rotation shaft to each other. According to such a configuration, for example, the rotational speed of the first vertical rotation axis can be changed by using a mechanism that converts the rotational motion of the first horizontal rotation axis into the rotational motion of the first horizontal rotation axis. As a result, the structure can be simplified as compared with a configuration in which the mechanism and the first transmission are separately provided.

In an embodiment of the present technology, the fluid may be water. In this case, the differential device may face the fluid through a weir that guides the fluid downward. The generator may be located opposite the weir relative to the differential device. According to such a configuration, the first rotating body and the second rotating body can be brought close to the weir. Accordingly, the falling energy of the fluid can be efficiently converted into the rotational motion of the first rotating body and the second rotating body.

In an embodiment of the present technology, a third transmission may be provided between the differential device and the generator. According to such a configuration, the third transmission can shift the rotational motion obtained by combining the rotational motion of the first rotating body and the rotational motion of the second rotating body. As a result, the structure can be simplified as compared with a configuration including separate transmissions for shifting the rotational motion of each rotating body.

In an embodiment of the present technology, a breaker may be provided between the third transmission and the generator. The breaker shuts off the connection between the third transmission and the generator. According to such a configuration, for example, when an abnormality occurs in the generator and the rotational motion of the input shaft of the generator is stopped in order to inspect and repair the generator, the connection between the third transmission and the generator is interrupted by the breaker. Thus, the rotational movement of each rotating body can be continued. Thus, even when an abnormality occurs in the generator, the fluid can be continuously provided downstream of the power generation device.

EXAMPLES

Figure 2:
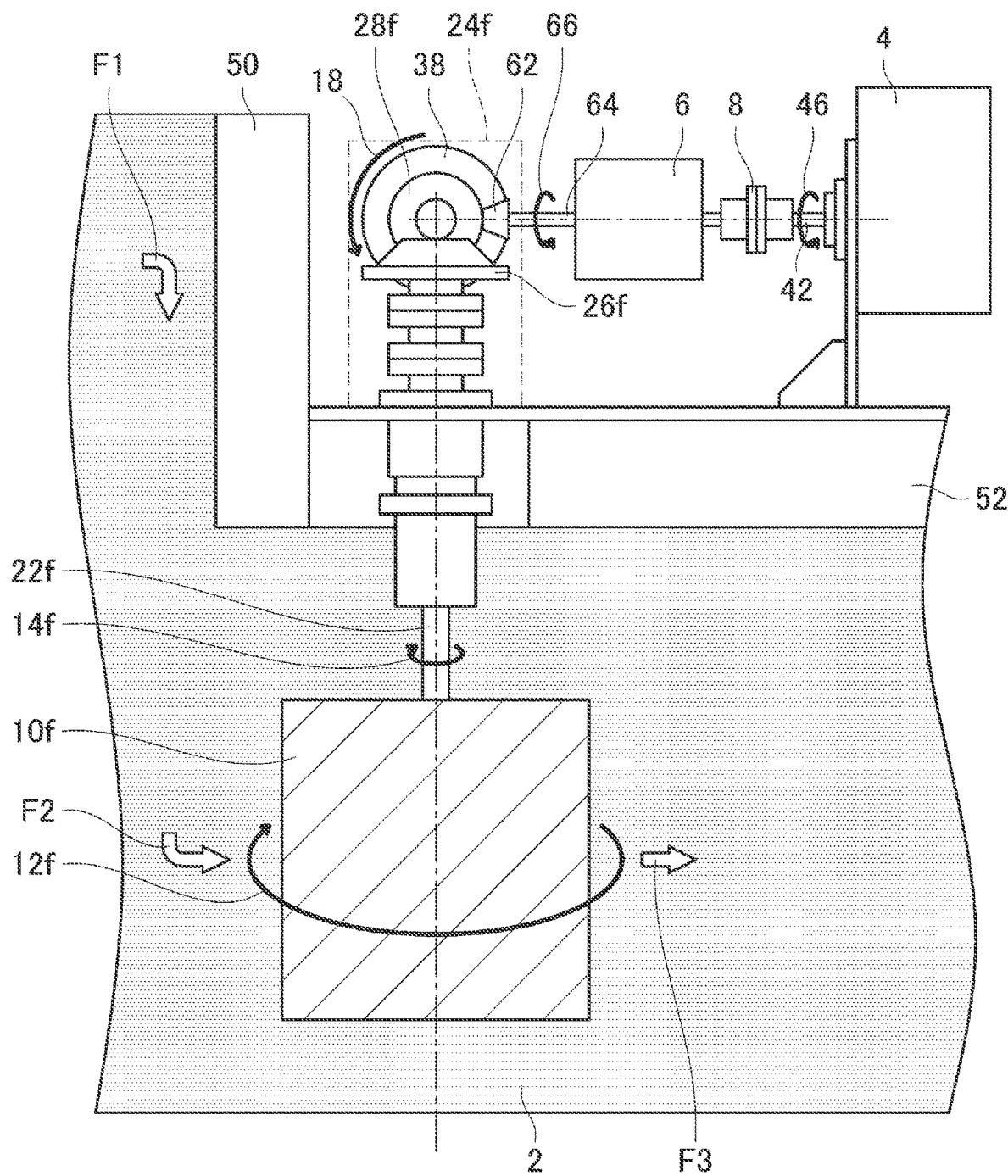
FIG. 2 shows a side view of the power generation device 100 of the embodiment.

Referring to FIGS. 1 and 2, a power generation device 100 of an embodiment will be described. The power generation device 100 of the present embodiment is a hydroelectric power generation system that drives a generator by hydroelectric power. The power generation device 100 is particularly similar to a relatively small micro-hydro power system. FIG. 1 is a front view of the power generation device 100 as viewed from the upstream side of the water channel 2. FIG. 2 is a side view of the power generation device 100. The power generation device 100 includes a generator 4, a first water turbine 10$f$, a first transmission 24$f$, a second water turbine 10$s$, a second transmission 24$s$, a differential device 30, a third transmission 6, and a breaker 8. The power generation device 100 increases the rotational motion of each water turbine 10$f$, 10$s$ by each transmission 24$f$, 24$s$, 6. The power generation device 100 transmits the increased rotational motion to the input shaft 42 of the generator 4. The power generation device 100 generates electricity by converting the transmitted rotational motion into electric energy by the generator 4. The electric power generated by the power generation device 100 is transmitted to a power system (not shown). Note that the positive side in the Z-axis direction in the coordinate axis in the drawing indicates the upward direction in the vertical direction. The negative side in the Z-axis direction indicates a downward direction in the vertical direction. The positive side in the Y-axis direction indicates the right side in the horizontal direction. The negative side in the Y-axis direction indicates the left side in the horizontal direction. Hereinafter, the positive side in the Z-axis direction may be simply referred to as "upper". The opposite side of the positive side in the Z-axis direction may be simply referred to as "lower". The positive side in the Y-axis direction may be simply referred to as "right". The opposite side of the positive side in the Y-axis direction may be simply referred to as "left".

The respective water turbine 10$f$, 10$s$ are arranged together in the water channel 2. The water channel 2 is a flow channel through which water flows. The water channel 2 may be, for example, a water channel for agricultural water. As shown in F3 from the arrow F1 in FIG. 2, in the water channel 2, water flows to the X-axis direction positive side (that is, to the right side of the drawing sheet in FIG. 2). When water flows in the water channel 2, the first water turbine 10$f$ rotates in the first longitudinal direction 14$f$. When water flows in the water channel 2, the second water turbine 10$s$ rotates in the second longitudinal 14$s$. The respective water turbine 10$f$, 10$s$ are rotating bodies that convert the energy of the water flowing in the water channel 2 into a rotational motion.

The first water turbine 10$f$ is connected to the differential device 30 via a first transmission path 20$f$. The first transmission path 20$f$ includes a first vertical rotation shaft 22$f$, a first transmission 24$f$, and a first horizontal rotation axis 29$f$. The first vertical rotation shaft 22$f$ is a drive axis extending upward from the first water turbine 10$f$. When the first water turbine 10$f$ rotates in the first longitudinal direction 12$f$, the first vertical rotation shaft 22$f$ also rotates in the first longitudinal direction 14$f$. The first vertical rotation shaft 22$f$ is connected to the first transmission 24$f$ via a joint. The first transmission 24$f$ includes a first vertical bevel gear 26$f$ and a first horizontal bevel gear 28$f$. The first vertical bevel gear 26$f$ is connected to the first vertical rotation shaft 22$f$. The first horizontal bevel gear 28$f$ is connected to the first horizontal rotation axis 29$f$. As described above, the first transmission 24$f$ connects the first vertical rotation shaft 22$f$ and the first horizontal rotation axis 29$f$ to each other. The bevel gear 26$f$, 28$f$ has an inclined surface. A plurality of teeth (not shown) is provided on the inclined surface.

When the first vertical rotation shaft 22$f$ rotates in the first longitudinal direction 14$f$, the first vertical bevel gear 26$f$ also rotates in the first longitudinal direction 14$f$. This causes the first horizontal bevel gear 28$f$ to rotate in the first lateral 16$f$. Thus, the first transmission 24$f$ converts the rotational movement of the first longitudinal direction 14$f$ into a rotational movement of the first lateral 16$f$.

Furthermore, the number of teeth of the first vertical bevel gear 26$f$ is less than the number of teeth of the first horizontal bevel gear 28$f$. In the present embodiment, the number of teeth of the first vertical bevel gear 26$f$ is twice the number of teeth of the first horizontal bevel gear 28$f$. Thus, while the first vertical rotation shaft 22$f$ rotates one time in the first longitudinal direction 14$f$, the first horizontal rotation axis 29$f$ rotates two times in the first lateral 16$f$. That is, the first transmission 24$f$ increases the rotational motion in the first vertical rotation shaft 22$f$ and transmits the rotational motion to the first horizontal rotation axis 29$f$. In the modification, for example, the number of teeth of the first vertical bevel gear 26$f$ may be three times the number of teeth of the first horizontal bevel gear 28$f$. The number of teeth of the first vertical bevel gear 26$f$ may be four times the number of teeth of the first horizontal bevel gear 28$f$.

As shown in FIG. 1, the first water turbine 10$f$ and the first transmission path 20$f$ and the second water turbine 10$s$ and the second transmission path 20$s$ have symmetrical shapes. Therefore, similarly to the first water turbine 10$f$, the second water turbine 10$s$ is connected to the differential device 30 via the second transmission path 20$s$. The second transmission path 20$s$ includes a second vertical rotation shaft 22$s$, a second transmission 24$s$, and a second vertical rotation shaft 22$s$. The second transmission path 20$s$ includes a second vertical bevel gear 26$s$ and a second horizontal bevel gear 28$s$. The second transmission 24$s$ connects the second vertical rotation shaft 22$s$ and the second horizontal rotation axis 29$s$ to each other. The rotational movement of the second water turbine 10$s$ is transmitted via the second transmission path 20$s$ as a second lateral 16$s$ at an increased speed to the differential device 30.

As described above, the power generation device 100 converts the rotational motion of the respective vertical rotation shafts 22$f$, 22$s$ into the rotational motion of the respective horizontal rotation axes 29$f$, 29$s$ by the respective transmission 24$f$ and the transmission 24$s$, and increases the rotational motion thereof. As a result, the configuration can be simplified as compared with a configuration in which a mechanism for converting the rotational motion of each vertical rotation shaft 22f, 22s into the rotational motion of each horizontal rotation axis 29f, 29s and a mechanism for increasing the rotational motion thereof are separately provided.

As shown in FIG. 1, the first longitudinal direction 12f in which the first water turbine 10f rotates and the second longitudinal 12s in which the second water turbine 10s rotates are opposed to each other. The rotational movement of the first longitudinal direction 12f of the first water turbine 10f is transmitted to the first side gear 32f of the differential device 30 via the first transmission path 20f. The rotational movement of the second longitudinal 12s of the second water turbine 10s is transmitted via the second transmission path 20s to the second side gear 32s of the differential device 30.

The differential device 30 comprises two spider gears 34, 36. As shown in FIG. 1, inside the differential device 30, each side gear 32f, 32s meshes with each spider gear 34, 36. Further, each spider gear 34, 36 is rotatably connected to a link gear 38. Thus, the differential device 30 rotates the link gear 38 by the rotational movement of the respective water turbine 10f, 10s. That is, the differential device 30 combines the rotational motion of the respective water turbine 10f, 10s as the rotational motion of the link gear 38. As described above, the differential device 30 has, for example, the same configuration as that of the differential gear mounted on the vehicle. Therefore, the differential gear of the vehicle may be used as the differential device 30.

As shown in FIG. 2, the link gear 38 meshes with the pinion gear 62. Thus, the rotational movement of the link gear 38 in the direction 18 is output to the pinion gear 62 as the rotational movement in the direction 66. As the pinion gear 62 rotates in direction 66, the composite shaft 64 also rotates in direction 66. The composite shaft 64 is connected to the input shaft 42 of the generator 4 via the third transmission 6 and the breaker 8. Therefore, the rotational motion output from the link gear 38 to the pinion gear 62 is output to the input shaft 42 of the generator 4 as the rotation in the direction 46 via the third transmission 6 and the breaker 8. As described above, the differential device 30 combines the rotational motion of the first water turbine 10f and the second water turbine 10s and outputs the combined rotational motion to the generator 4. The generator 4 converts the rotational motion output from the differential device 30 into electrical energy.

As described above, water such as agricultural water flows in the water channel 2. Foreign matter may be mixed into the water flowing through the water channel 2. If the differential device 30 is arranged in the water channel 2, foreign matter flowing in the water channel 2 enters between the respective gear 32f, 32s, 34, 36 of the differential device 30. As a result, an abnormality may occur in the differential device 30. As shown in FIG. 1, in the water channel 2, the respective water turbine 10f, 10s are arranged along the horizontal direction (i.e., the Y-axis direction). On the other hand, the differential device 30 is disposed to be offset in a vertical direction (i.e., the Z-axis direction) perpendicular to the horizontal direction with respect to the respective water turbine 10f, 10s. The differential device 30 is positioned vertically above the respective water turbine 10f, 10s. Therefore, the differential device 30 is disposed above the water flowing through the water channel 2. Thus, the differential device 30 is not exposed to the water in the water channel 2. In addition, the water in the water channel 2 is prevented from reaching the differential device 30 along the transmission path 20f, 20s. Therefore, even if a foreign substance is mixed into the water channel 2, the foreign substance does not enter between 32f, 32s, 34, and 36 of the differential device 30. That is, according to the power generation device 100 of the present embodiment, the durability of the differential device 30 can be improved.

Although not shown, the third transmission 6 includes an input gear connected to the composite shaft 64 and an output gear connected to the input shaft 42. In the present embodiment, the number of teeth of the input gear of the third transmission 6 is 25 times the number of teeth of the output gear. That is, the third transmission 6 further increases the rotational movement of the composite shaft 64 in the direction 66. As a result, a rotational motion suitable for generating power of the generator 4 is input to the input shaft 42 of the generator 4. In the power generation device 100 of the present embodiment, the third transmission 6 is provided between the differential device 30 and the generator 4. Therefore, the third transmission 6 can increase the rotational motion obtained by combining the rotational motions of the respective water turbine 10f, 10s. As a result, the construction can be simplified as compared with a configuration including two third transmissions 6 that increase the rotational motion of the respective water turbine 10f, 10s.

The breaker 8 shuts off the connection between the third transmission 6 and the input shaft 42 of the generator 4. For example, when an abnormality occurs in the generator 4, it is necessary to stop the rotational movement of the input shaft 42 of the generator 4 in order to inspect and repair the generator 4. If a configuration that does not include the breaker 8 is adopted, the rotational motion of the respective water turbine 10f, 10s is also stopped by stopping the rotational motion of the input shaft 42. In such cases, the flow rate in the water channel 2 may decrease due to the respective water turbine 10f, 10s. For example, when the agricultural water flows through the water channel 2, if the flow rate of the water channel 2 decreases, the use of the agricultural water may not be possible downstream of the water channel 2. When an abnormality occurs in the generator 4, the power generation device 100 of the present embodiment cuts off the connection between the third transmission 6 and the input shaft 42 by the breaker 8. Accordingly, even if an abnormality occurs in the generator 4, it is possible to suppress a decrease in the flow rate of the water channel 2. The use of agricultural water (or other water) downstream of the water channel 2 may also be continued. The breaker 8 is provided between the third transmission 6 and the generator 4. The breaker 8 may transmit and block the rotational motion after the speed increase. Therefore, the torque of the rotational movement to be transmitted and interrupted by the breaker 8 is relatively small. Therefore, a relatively simple circuit breaker 8 can be employed.

As shown in FIG. 2, the water channel 2 includes a weir 50 and an upper wall 52. The weir 50 and the upper wall 52 are skeletons that together form the water channel 2. The weir 50 and the upper wall 52 are made of concrete. The power generation device 100 is disposed on the upper surface of the upper wall 52. As shown in the arrow F2 in FIG. 2, the water in the water channel 2 is guided downward by the weir 50. The water in the water channel 2 falls downward by the weir 50. The water falling downward reaches the first water turbine 10f as indicated by the arrow F2. The water that has reached the first water turbine 10f rotates the first water turbine 10f in the first longitudinal direction 14f. In this manner, the first water turbine 10f is rotated by using the falling-energy of the water. This makes it possible to rotate the first water turbine 10f energy-efficiently even with a small amount of water.

Further, as shown in FIG. 2, the differential device 30 faces the water in the water channel 2 via the weir 50. The generator 4 is located on the opposite side of the differential device 30 from the weir 50. Thus, the first water turbine 10f and the second water turbine 10s can be brought close to the weir 50. As a result, the water turbine 10f, 10s can efficiently use the falling energy of the water. Further, by bringing the respective water turbine 10f, 10s close to the weir 50, it is possible to reduce the skeleton around the weir 50. This makes it possible to facilitate the manufacture of the water channel 2.

Specific examples of the technology disclosed in the present specification have been described in detail above. However, these are merely examples and do not limit the scope of the claims. Various modifications and variations of the specific examples described above are included in the technology described in the claims. Variations of the above embodiments are listed below.

First Modification

For example, the differential device 30 may be positioned downward with respect to the respective water turbine 10f, 10s. In a further variant, the differential device 30 may be located leftward relative to the vertically arranged water turbine 10f, 10s. In this case, the up-down direction is an example of the "first direction", and the left-right direction is an example of the "second direction".

Second Modification

The power generation device 100 may include a first wind turbine and a second wind turbine instead of the respective water turbine 10f, 10s. In that case, the wind may be an example of a "fluid," and the power generation device 100 may be a wind power generation system that powers a generator with wind power.

Modification 3

The number of teeth of the first vertical bevel gear 26f and the number of teeth of the first horizontal bevel gear 28f may be the same. Similarly, the number of teeth of the second vertical bevel gear 26s and the number of teeth of the second horizontal bevel gear 28s may be the same. That is, the power generation device 100 may not include the first transmission 24f and the second transmission 24s. Further, in a further modification, for example, the first transmission 24f may be provided in the first vertical rotation shaft 22f. In this case, the first transmission 24f may not connect the first vertical rotation shaft 22f and the first horizontal rotation axis 29f to each other.

Modification 4

The water channel 2 may not include the weir 50. In a further variant, the differential device 30 may be located opposite the weir 50 with respect to the generator 4.

Modification 5

The power generation device 100 may not include the breaker 8. Further, in a further modification, a breaker may be provided in each of the first transmission path 20f and the second transmission path 20s.

The technical elements described in this specification or in the drawings may be used alone or in various combinations, and are not limited to the combinations described in the claims at the time of filing. Further, the technology illustrated in the present specification or the drawings can achieve a plurality of objects at the same time, and has technical usefulness by achieving one of the objects.

What is claimed is:

1. A power generation device comprising:
   a first rotating body that converts energy of fluid into rotational motion;
   a second rotating body that converts energy of fluid into rotational motion;
   a differential device that is connected to the first rotating body via a first transmission path and to the second rotating body via a second transmission path, and that combines the rotational motion of the first rotating body and the rotational motion of the second rotating body and outputs the rotational motion; and
   a generator that converts the rotational motion output from the differential device into electric energy, wherein:
   the first rotating body and the second rotating body are arranged along a horizontal direction;
   the differential device is positioned vertically above, in a vertical direction perpendicular to the horizontal direction of the first rotating body and the second rotating body;
   the differential device faces the fluid via a weir that guides the fluid downward; and
   the generator is located on an opposite side of the differential device from the weir.

2. The power generation device according to claim 1, wherein:
   the first transmission path includes a first vertical rotation shaft, a first horizontal rotation shaft, and a first transmission, the first vertical rotation shaft extending upward from the first rotating body, the first horizontal rotation shaft extending horizontally from the first vertical rotation shaft to the differential device, and the first transmission connecting the first vertical rotation shaft and the first horizontal rotation shaft to each other; and
   the second transmission path includes a second vertical rotation shaft, a second horizontal rotation shaft, and a second transmission, the second vertical rotation shaft extending upward from the second rotating body, the second horizontal rotation shaft extending horizontally from the second vertical rotation shaft to the differential device, and the second transmission connecting the second vertical rotation shaft and the second horizontal rotation shaft to each other.

3. The power generation device according to claim 1, further comprising a third transmission provided between the differential device and the generator.

4. The power generation device according to claim 3, further comprising a breaker that is provided between the third transmission and the generator and that disconnects a connection between the third transmission and the generator.

5. The power generation device according to claim 1, wherein the generator, the differential device and the weir are arranged along a third direction that is perpendicular to the horizontal direction and the vertical direction.

* * * * *